US006655657B2

(12) United States Patent
Bircann

(10) Patent No.: US 6,655,657 B2
(45) Date of Patent: Dec. 2, 2003

(54) COKING-RESISTANT BEARING

(75) Inventor: Raul Armando Bircann, Penfield, NY (US)

(73) Assignee: Delphi Technologies, Inc., Troy, MI (US)

( * ) Notice: Subject to any disclaimer, the term of this patent is extended or adjusted under 35 U.S.C. 154(b) by 76 days.

(21) Appl. No.: 09/875,785

(22) Filed: Jun. 6, 2001

(65) Prior Publication Data

US 2002/0185624 A1 Dec. 12, 2002

(51) Int. Cl.[7] .......... F16K 31/44

(52) U.S. Cl. .......... 251/214; 123/520; 123/568; 137/247

(58) Field of Search .......... 123/520, 568, 123/568.2; 137/242; 251/214

(56) References Cited

U.S. PATENT DOCUMENTS 3,809,046 A * 5/1974 Kammeraad .......... 123/188.9
5,609,143 A * 3/1997 Schellenberg et al. . 123/568.18
5,996,559 A * 12/1999 Busato et al. .......... 123/520
6,247,461 B1 * 6/2001 Smith et al. .......... 123/568.2

* cited by examiner

*Primary Examiner*—Gene Mancene
*Assistant Examiner*—Melvin A Cartagena
(74) *Attorney, Agent, or Firm*—Patrick M. Griffin

(57) ABSTRACT

An EGR valve for use in an engine includes a valve body defining an internal passage for the passage of exhaust gas through the valve and a bearing supported in the passage having a bearing surface including an end portion adjacent to the internal passage, with at least one groove formed within the bearing surface sufficient to create an air pocket that resists fluid intrusion into the bearing. A valve member is movable in the valve body for controlling exhaust gas flow through the passage and includes a shaft supported for reciprocating motion along the bearing surface of the bearing. A lubricious insert may also be provided in the bearing surface of the bearing adjacent the end portion of the bearing surface for inhibiting the formation of coking within the bearing.

4 Claims, 2 Drawing Sheets

COKING-RESISTANT BEARING

TECHNICAL FIELD

This invention relates to automotive vehicle engine valves, and in particular to a bearing disposed within an exhaust gas recirculation (EGR) valve.

BACKGROUND OF THE INVENTION

It is known in the art relating to automotive vehicle engines to provide selective recirculation of engine exhaust gases into the intake manifold in order to control exhaust emissions. To this end, an exhaust gas recirculation (EGR) valve may be provided which includes a valve assembly connectable with associated intake and exhaust manifolds or systems of the engine to meter the flow of exhaust gas from the intake to the exhaust.

EGR valves typically include a valve assembly operable to close or open a passage between the intake and exhaust manifolds. The valve assembly includes a valve member (or pintle) having a head connected with a shaft supported by a bearing for reciprocating motion within a valve body. An actuator assembly is operably connected with the valve assembly and includes a solenoid coil and an armature connectable with the valve member. The solenoid coil actuates the armature to open the EGR valve, which, in turn, is closed by a spring when the coil is deenergized.

To minimize leakage of exhaust gas into the valve assembly and/or the solenoid actuator, the diametral clearance between the valve shaft and its bearing is very tight, in the range of ±0.03 mm or less. The need to minimize gas leakage is balanced against the need to minimize hysteresis (and thus enhance actuator performance) which requires the diametral clearance between the valve shaft and its supporting bearing to be as large as possible (i.e. large enough to permit only an acceptable amount of exhaust gas leakage, less than 0.5 g/s, while limiting moisture intrusion).

In operation, the valve shaft is selectively exposed to exhaust gas as it operates to selectively admit exhaust gas into the valve assembly. Because exhaust gas (particularly diesel exhaust gas) has a high moisture content and is laden with particulates, the valve shaft may become coked, and the coking drawn into the bearing when the valve is closed. The accumulation of contaminants on the surfaces of the valve shaft and bearing may cause the shaft to seize in the bearing.

It is therefore desirable to provide a bearing having coking-resistant features that may be retrofit to any valve assembly, and in particular to EGR valves.

SUMMARY OF THE INVENTION

The present invention provides a coking-resistant bearing for use in an engine valve including a valve body defining an internal passage for the passage of exhaust gas through the valve and a valve member movable in the valve body for controlling exhaust gas flow through the passage, the valve member includes a shaft supported for reciprocating motion within the bearing.

The coking-resistant bearing includes an engagement surface having an end portion adjacent to the internal passage defined by the valve body. The end portion of the engagement surface includes at least one groove disposed therein sufficient to create an air pocket that resists fluid intrusion into said bearing. The groove may also include a scraping edge formed along the bearing surface such that the scraping edge of the groove gently scrapes against the valve shaft as it reciprocates along the engagement surface to remove contaminants from the shaft without interfering with shaft actuation.

To further inhibit the formation of coking contaminants within the bearing, a highly lubricious insert may be provided within the engagement surface of the bearing adjacent its end portion. The insert may be used within a bearing with or without an end portion including a groove.

These and other features and advantages of the invention will be more fully understood from the following description of certain specific embodiments of the invention taken together with the accompanying drawings.

DESCRIPTION OF THE PREFERRED EMBODIMENT

Figure 1:
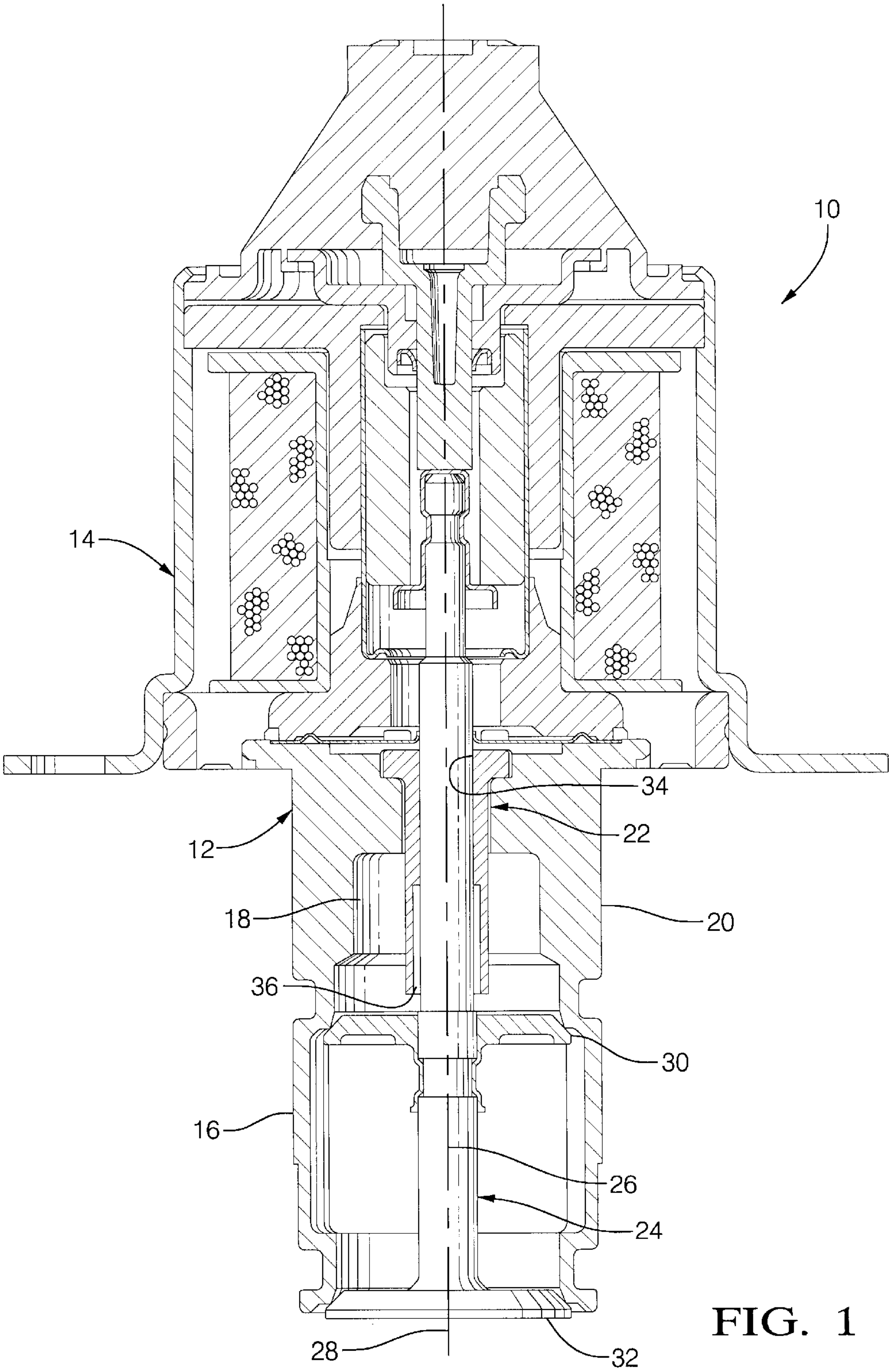
FIG. 1 is a cross-sectional view of an EGR valve including a shaft bearing according to the invention.

Referring now to the drawings in detail, numeral 10 generally indicates an EGR valve suitable for diesel applications. Valve 10 includes a valve assembly 12 coupled to a solenoid actuator 14. The valve assembly 12 includes a valve body 16 having a generally cylindrical form and defining an internal passage 18 for the passage of exhaust gas through the valve 10. The valve body 16 further includes a mounting portion 20 that connects the valve assembly 12 to the solenoid actuator 14. Mounting portion 20 also carries a shaft bearing 22 formed according to the invention.

Valve assembly 12 further includes a valve member 24 including a shaft 26 supported by the bearing 22 for reciprocating motion along an axis 28 on which the cylindrical valve body 16 is aligned. Below the bearing 22, the shaft supports dual valve heads 30, 32 which seat against spaced seats in the valve body 16.

The shaft bearing 22 is mounted so as to permit slight lateral motion within the valve body 16 to allow alignment of the bearing with the valve seats along the axis 28. Bearing 22 is provided with a relatively long, high aspect ratio bearing surface 34 which extends the full length of the bearing for engaging and guiding the valve shaft 26.

Figure 2:
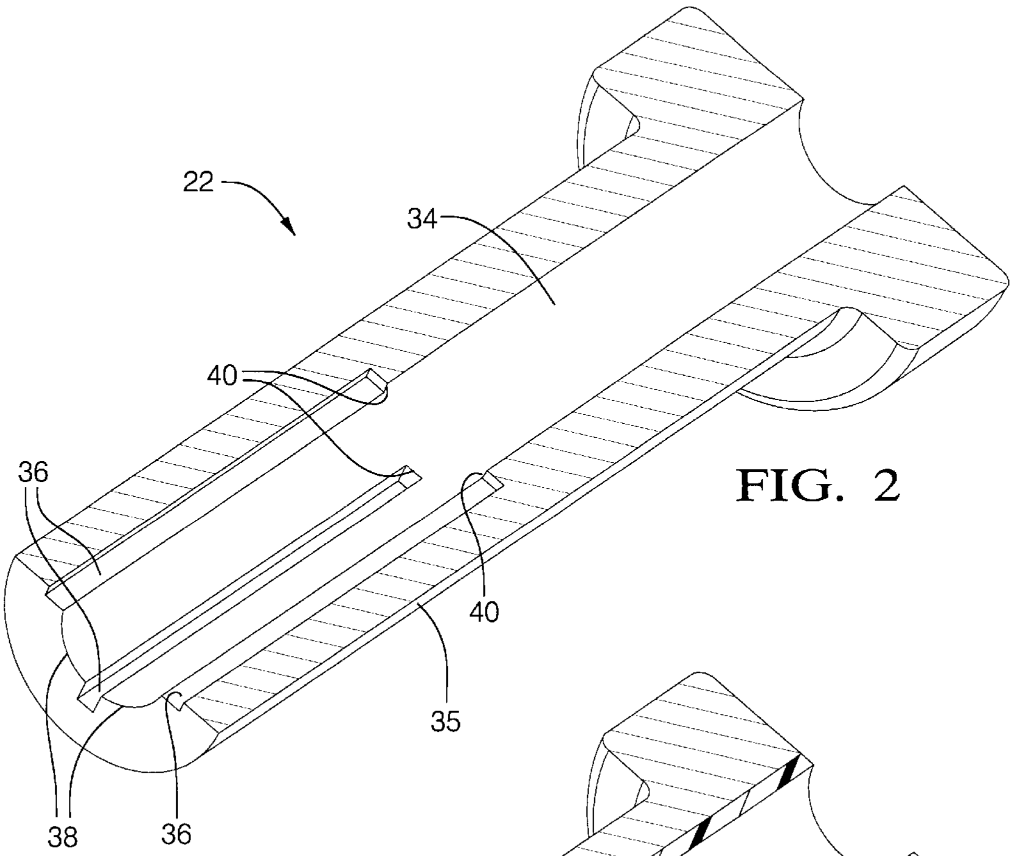
FIG. 2 is a pictorial cross-sectional view of the shaft bearing in the embodiment of FIG. 1.

As seen in FIG. 2, the lower end portion 35 of the bearing includes a plurality of longitudinally extending circumferentially spaced grooves or flutes 36. The flutes provide a reduction in the solid engagement length of the bearing but without diminishing support for the shaft over the bearing length. Capillary volume between the bearing surface and the shaft is increased in correspondence with the flute volume, thereby diminishing the potential intrusion and accumulation of sooty fluids from the exhaust gases passing through the valve. The flutes 36 generate standing insulating air pockets which resist fluid intrusion. In addition the flutes facilitate free expulsion of debris and act in a scraping capacity to help maintain the shaft clean. This action thus contributes appreciably to the reduction of hysteresis during valve operation which may be caused by deposits accumulating between the bearing surface and the valve shaft. Lower edge surfaces 38 of the bearing surface 34 and upper edge surfaces 40 at the upper ends of the flutes provide scraping edges which tend to remove any buildup of sooty deposits from the bearing and cause them to pass out through the bottom of the flutes or prevent their being formed above the lower edge of the bearing surface 34.

Figure 3:
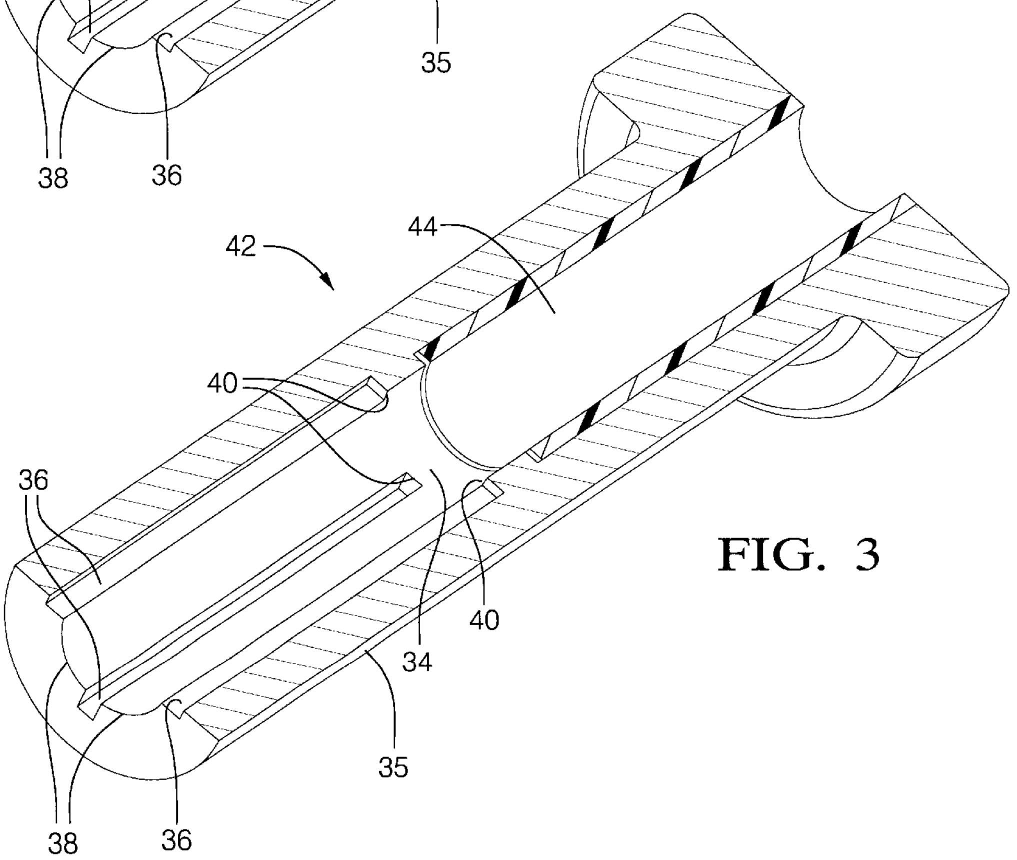
FIG. 3 is a view similar to FIG. 1 showing an alternative embodiment of shaft bearing.

Referring now to FIG. 3 there is shown an alternative embodiment of shaft bearing 42 which is similar to bearing 22 as is best shown in FIG. 2 and wherein like numerals indicate like features. Bearing 42 differs in the addition to the upper portion of the bearing of a self conforming lubricious metal polymer sleeve 44 which lowers the coefficient of friction in the bearing and improves actuator efficiency by inhibiting the adhesion of resin forming particulate particles such as soot. To the extent that sooty particles do work their way up the bearing surface to the sleeve 44, any sooty particles which become trapped within the bearing surface will become embedded in the conforming polymer sleeve and thus be disinclined to adhere to the valve shaft and cause any impairment of its free movement.

The improved embodiments of a shaft bearing for an EGR valve as described provide an extended bearing life by reducing the collection of soot particles and varnish-like materials on the valve shaft and bearing surfaces as well as providing means for reducing the effect of any contaminants which do find their way into the bearing surface area. The result is an increased operating life for the associated EGR valve without the development of substances which interfere with motion of the shaft and the resulting operation of the EGR valve.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. An EGR valve for use in an engine, comprising:

a valve body defining an internal passage for the passage of exhaust gas through the valve;

a bearing supported in the passage having a bearing surface including an end portion adjacent to said internal passage, the end portion of the bearing surface including at least one axial groove disposed therein open at the end portion and defining an air pocket that resists fluid intrusion into said bearing;

a valve member movable in the valve body for controlling exhaust gas flow through the passage, the valve member including a shaft supported for reciprocating motion along the bearing surface of the bearing.

2. The EGR valve of claim 1, wherein said at least one groove includes a scraping edge formed along the bearing surface, and said valve shaft is supported for reciprocating motion along said bearing surface such that the scraping edge of the groove gently scrapes against the valve shaft to remove contaminants from the shaft without interfering with shaft actuation.

3. The EGR valve of claim 1, further comprising a lubricious bearing insert disposed within the bearing surface of said bearing, adjacent said end portion.

4. An EGR valve for use in an engine, comprising:

a valve body defining an internal passage for the passage of exhaust gas through the valve;

a bearing supported in the passage having a bearing surface, and a lubricious bearing insert disposed within the bearing surface;

a valve member movable in the valve body for controlling exhaust gas flow through the passage, the valve member including a shaft supported for reciprocating motion along the bearing surface of the bearing;

wherein the bearing surface of the bearing includes an end portion adjacent to the internal passage defined by the valve body, said end portion of the bearing surface including a plurality of axial grooves formed therein and defining air pockets that resist fluid intrusion.

* * * * *